United States Patent [19]

Kirst

[11] Patent Number: 4,759,686
[45] Date of Patent: Jul. 26, 1988

[54] DEVICE FOR AUTOMATIC INTERCHANGE AND COUPLING OF GRIPPERS TO ROBOTS OR MANIPULATING DEVICES

[76] Inventor: Rudi Kirst, Augustastrasse 22, D-4081 Langenfeld, Fed. Rep. of Germany

[21] Appl. No.: 681,213

[22] Filed: Dec. 12, 1984

[30] Foreign Application Priority Data

Dec. 29, 1983 [DE] Fed. Rep. of Germany ....... 3347423

[51] Int. Cl.⁴ .............................................. B66C 1/00
[52] U.S. Cl. ................................ 414/729; 414/744 A; 901/49; 279/75; 24/603
[58] Field of Search ......................... 901/30, 9, 50, 49; 414/729, 730, 744 A; 180/89.15; 24/453, 603, 606-608; 279/75, 80; 285/914

[56] References Cited

U.S. PATENT DOCUMENTS

| 2,926,020 | 2/1960 | Dayton et al. | 279/75 |
| 3,287,031 | 11/1966 | Simmons et al. | 285/914 X |
| 3,398,965 | 8/1968 | Cox | 279/75 X |
| 3,430,305 | 3/1969 | Geffner | 24/603 |
| 3,521,895 | 7/1970 | Smith | 279/75 X |
| 4,144,794 | 3/1979 | Silverman et al. | 24/607 X |
| 4,211,439 | 7/1980 | Moldestad | 285/914 X |
| 4,514,616 | 4/1985 | Warner | 901/49 X |
| 4,525,918 | 7/1985 | Puritz | 901/50 X |
| 4,545,723 | 10/1985 | Clark | 901/50 X |
| 4,549,846 | 10/1985 | Torii et al. | 901/30 X |
| 4,700,932 | 10/1987 | Katsuno | 901/49 X |

FOREIGN PATENT DOCUMENTS 2141249 3/1972 Fed. Rep. of Germany .
3241132 5/1984 Fed. Rep. of Germany ........ 901/49

Primary Examiner—Robert J. Spar
Assistant Examiner—Jennifer Doyle
Attorney, Agent, or Firm—Antonelli, Terry & Wands

[57] ABSTRACT

A device for an automatic interchange and coupling of grippers on robots or manipulating devices includes a mounting member connectable to a robot and a gripper-holding interchanging plate which is formed with recesses receiving locking balls or pins interpositioned between the interchanging plate and an actuation cone of an axially movable piston positioned in the mounting member. The movement of the piston causes the actuation cone to push the locking balls or pins to move radially outwardly into the recesses of the interchanging plate to lock the latter with the mounting member.

19 Claims, 4 Drawing Sheets

Fig.1A
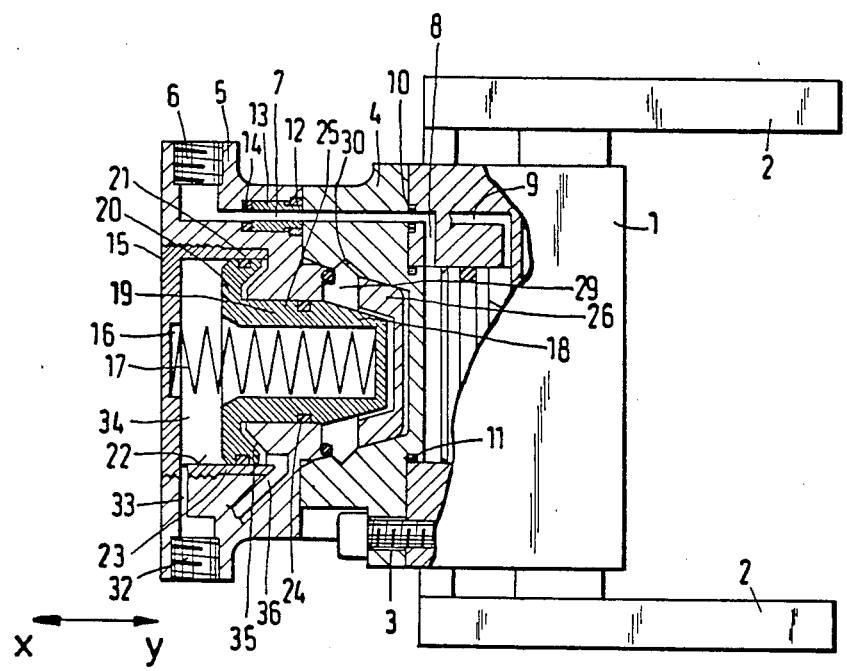
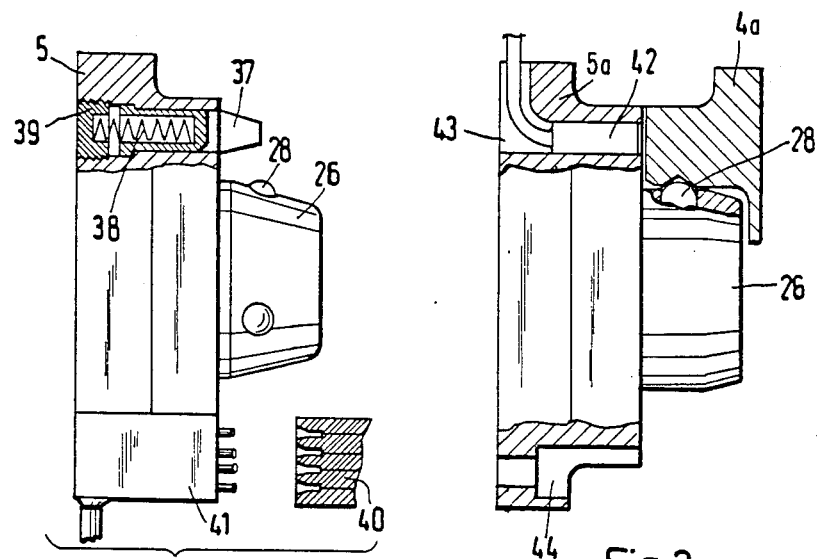
Fig.2    Fig.3

Fig.6
Fig.7
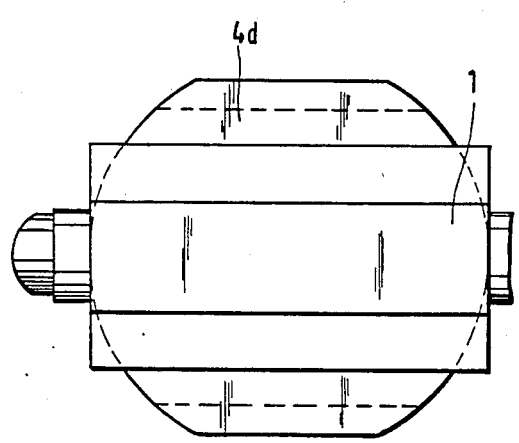
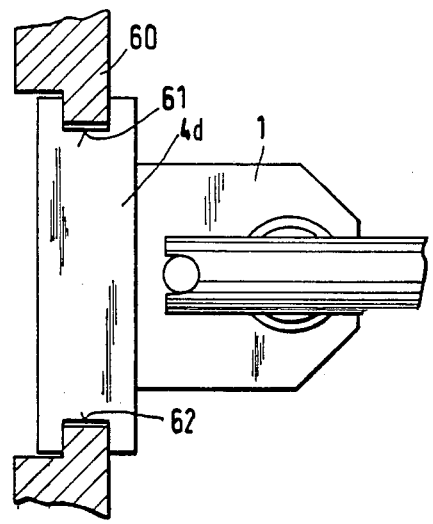
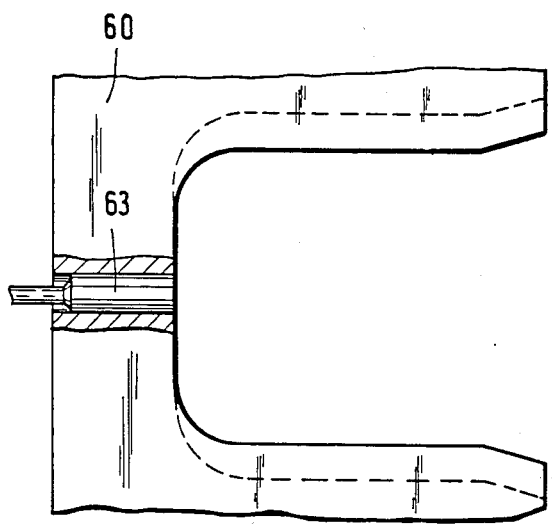
Fig.8

DEVICE FOR AUTOMATIC INTERCHANGE AND COUPLING OF GRIPPERS TO ROBOTS OR MANIPULATING DEVICES

BACKGROUND OF THE INVENTION

The present invention relates to a device for an automatic interchange of grippers to robots or manipulating devices.

Devices for coupling grippers to robots or manipulating devices of the aforementioned type generally include a mounting or receiving body or member, and an interchanging plate carrying a gripper removably-connectable to the mounting body.

A complete automation during the manufacture and assembling of articles of manufacture has, until now, only been possible in mass production. Various article or workpiece dimensions or their differing geometries have required an exchange of grippers or gripper jaws carrying the tools.

A fully automatic programmable tool exchange or tool plate exchange has been known in machine tools or treatment centers.

It has not been possible to provide an automatic and programmable gripper exchange in the field of robot technology without overcoming considerable difficulties requiring complex solutions.

An automatic manufacturing operation for producing a limited number of a line of products has been possible only when the machine tool and the manipulating device or robot were adjusted to a new workpiece corresponding to a new line of products to be manufactured.

A gripper-interchange system has been known, in which receiving or engaging forces of the interchanging plate are generated by electromagnets mounted in the receiving body. Although the principle of operation of this system is very simple, the system has substantial disadvantages. During the manufacture of iron-containing articles or, in the case of iron-containing chips, this system cannot be employed because there is a danger of contamination of this system. In case of power failure the interchanging plate can suddenly drop. The entire weight of the system in comparison with its holding force is large.

Another known device of this type operates with compressed air and included laterally extended pressure air cylinders which effect locking of the interchanging plate carrying the gripper to the mounting plate connected to a robot. A bulky, heavy and complex intermediate member for receiving an also complicated gripper-receiving or interchanging plate is arranged between these two cylinders. The heavy weight of this conventional device substantially limits the abilities of the device to receive heavy workpieces. If rather heavy articles are to be produced another adjacent large robot must be employed to treat the articles. Dimensions of this device, however, considerably limit its application. Furthermore, since the conventional device requires special treatment procedures during its manufacturing, it has been very costly. In addition, an extremely costly interchanging plate is required for each gripper.

Yet another known device for coupling the gripper-holding interchanging plate with a mounting or receiving body includes a short or steep cone with tension belts pulled into another cone. This device has been known in the field of machine tools, and, more particularly, in milling machines. The coupling and locking of the gripper-holding plate with the mounting body, and therefore a safety, are ensured even in the case of power failure. With milling machines, a sufficient space is available along the machine so that the weight of the pulling motor does not present any disturbance. However, because of its limited volume, this system is not suitable for application in industrial robots. The weight of this system reduces a possible weight of workpieces being treated, and the overall length of the system requires a specific robot head. In as much as a special robot head must be provided with an electric motor or compressed air motor, the system has not been and could not be universally utilized.

SUMMARY OF THE INVENTION

It is an object of the invention to provide an improved device for an automatic interchange and coupling of grippers on robots or manipulation devices of the type having a mounting body and a removably-detachable interchanging plate holding the gripper.

It is another object of the present invention to provide an automatic gripper-interchanging and coupling device which can be universally utilizable and can be employed practically with all robots and manipulating apparatus.

Yet another object of this invention resides in the providing of a coupling device which eliminates any danger of the falling of a gripper or the disconnection of the interchanging plate holding the gripper from the mounting body in case of a power failure.

A further object of this invention is to provide a gripper interchanging device which has a reduced weight, smaller dimensions, and simpler construction as compared to those of conventional gripper-interchanging and coupling arrangements.

These and other objects of the present invention are attained by a device for an automatic interchanging and coupling of grippers on robots or manipulating devices, comprising a mounting body connectable to a robot; a gripper-holder interchanging plate removably-connectable to the mounting body; and coupling means for coupling said interchanging plate to the mounting body and including a piston movable in the mounting body along an axis thereof, an actuation cone mounted to the piston, and adjustable locking elements cooperating with the cone and aligning and locking the interchanging plate with the mounting body in a form-and/or force locking fashion.

The present invention offers an automatic gripper-interchanging system which is universally utilizable and therefore can be employed practically in all industrial robots and manipulating devices. The device according to the present invention is very compact, is light weight and is inexpensive. Furthermore, an integral energy supply to, for example, the grippers, is provided within the construction and can be automatically separated. Furthermore, the device can have various control functions provided by, for example, plugs, strips, approximation switches or the like. It is specifically advantageous that, in the case of power failure, the interchanging plate with the gripper can not fall but is held in its assembled position by the locking elements in the form-and/or force-locking manner. Therefore, the proposed construction enables a reliable, safe and automatic interchange of grippers on the robots or similar manipulating devices, with a precise alignment of the elements to be coupled.

The piston may be cylindrical and have a piston rod, with the piston rod being formed in one piece with the actuation cone.

The interchanging plate may be formed with recesses, with the locking elements, upon the movement of said piston being radially outwardly pressed by the cone into the recesses to thereby couple the interchanging plate to the mounting body.

The locking elements may be pins, balls or pins having conical tips engageable in the recesses of the interchanging plate.

The actuation cone, upon a simple axial mutual displacement of the mounting body and the interchanging plate, snappingly pushes the locking balls or pins into the respective recesses of the interchanging plate, which is important for an automatic interchange of these structural components.

The piston is loadable with pressure of a pressurized medium at two sides thereof, and its movement path along the axis of the mounting body may be adjustable by said pressure.

The device may further include a spring which continually urges said actuation cone in a coupling position, so that in the case of power failure the parts remain held with each other in the coupled position not only by a form-locking and force-locking connection but also by means of the force of said spring.

The locking elements are displaceable against a force of said spring and tend to move to the coupling position.

The piston and the actuation cone may be formed in one piece and they both are formed axially symmetrical. Such a construction is particularly advantageous and inexpensive for turning machine tools.

The cylindrical piston with its piston rod and said actuation cone may be a one-piece hollow member which has one open side, with the spring being a compression spring which extends in the member and is supported at one end thereof against the mounting body and at another end thereof against a closed side of the member which forms said actuation cone. This embodiment is particularly space-saving and allows for a significant reduction in weight of the device. Further, a space for accommodating the spring is available within the hollow piston.

The mounting body may include an axially spring-biased centering cone engageable in a centering recess provided in the interchanging plate. The centering cone provides for a precise radial alignment of the interchanging plate with the mounting body.

The mounting body may be formed in one-piece with another centering cone, and the interchanging plate is formed with a recess conforming to the another centering cone and engages the latter is assembly.

The device may further include a number of proximity switches which inform a user of whether the interchanging plate is coupled to the mounting body, and whether a suitable interchanging plate is coupled to the mounting body in a correct position. For example, three proximity switches can offer six code combinations to determine an automatic correspondence of the interchanging plate to the mounting body.

The device may further include an electric plug mounted to the mounting body and at least one coupling element connectable to the plug for transmitting electrical signals. Thereby it can be determined, for example, whether or not a workpiece is engaged by the gripper or whether or not the gripper fingers lie correctly on a workpiece.

The locking element may be formed by an elastic ring, formed, for example, of an elastomer.

The interchanging plate may be provided with opposing side grooves for supporting in a predetermined position of a magazine plate.

The device may further include a self-sealing elastic sleeve mounted in a region between the mounting body and the interchanging plate for passing the pressurized medium therethrough.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1A is an axial partial cross-sectional view of a first embodiment of a device for an automatic interchange and coupling of grippers on robots or manipulating devices;

FIG. 2 is an exploded partial cross-sectional view of a detail of a portion of the device for an automatic interchange and coupling of grippers constructed in accordance with the present invention;

FIG. 3 is a partial cross-sectional view of a further modification of a detail for the device constructed in accordance with the present invention;

FIG. 6 is a top plan view of a gripper associated with an interchanging plate in accordance with yet another embodiment of the present invention;

FIG. 7 is a partial cross-sectional view of the embodiment of FIG. 6; and

FIG. 8 is a side view of the emboidment illustrated in FIGS. 6 and 7.

DETAILED DESCRIPTION

Figure 1B:
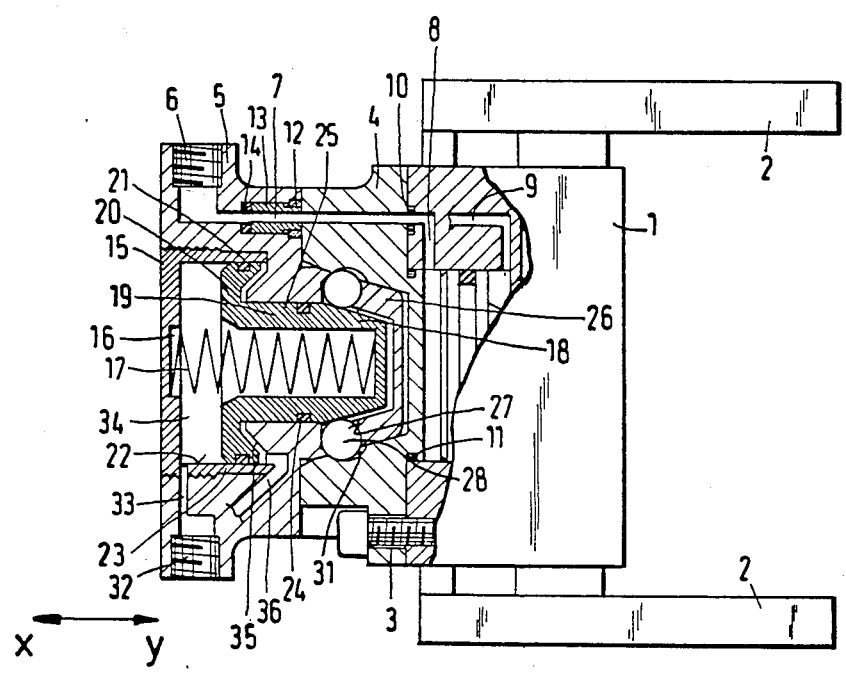
FIG. 1B is an axial partial cross-sectional view of another embodiment of a device for automatic interchange and coupling of grippers on robots or manipulating devices.

Referring now to the drawings wherein like reference numerals are used throughout the various views to designate like parts and, more particularly, to FIGS. 1 and 2, according to these figures, a gripper 1 is provided with a plurality of gripping fingers 2, with the gripper 1 being releasably attached by a plurality of circumferentially distributed screws 3, only one of which is shown in the drawings, to an interchanging plate 4. The interchanging plate 4 is, in turn, automatically releasably connectable with a mounting of receiving body 5 in a conventional manner.

A pressure medium supply, for example, pressurized air, is supplied to the gripper 1 through a conduit (not shown) by way of a connection opening 6 and passages 7, 8 and 9 which are in communication with each other. Sealing means 10, 11, 12 such as, for example, O-rings are provided for ensuring that the structural components are pressure-air tight sealed from each other. A sleeve 13 made, for example, of a suitable synthetic plastic material or elastomer is elastically supported at a rear side thereof against a sealing element 14 so that the sleeve 13, at a front side thereof, lies against a planar parallel wall of the interchanging plate 4 surrounding the passage 8.

A cover 15 is threadably inserted into the mounting or receiving body 5, with the cover 15 having a central recess 16 acting as a bearing support for a compression spring 17. The opposite end of the compression spring 17 is supported against an inner end face of an actuation cone which is integrally connected to a piston rod 19 of an axially displaceable cylindrical piston. The piston 20 is longitudinally and sealingly displaced through a sealing element 21 along an inner wall 22 of the cylindrical portion 23 of the cover 15. The piston rod 19 is also longitudinally and sealingly displaceable through a sealing element 24 in a cylinder 25.

As shown in FIGS. 1A, 1B and 2, a centering cone 26 is integrally formed into one piece with the mounting body 5, with the centering cone 26 including a plurality of recesses or openings 27 circumferentially distributed on the centering cone 26. These openings 27 engage therein locking members or elements of the device. As shown in FIG. 1B, a locking element may be in the form of a ball 28 while, as shown in FIG. 1A, the locking element may be in the form of a pin 29 with a conical tip. It is to be understood that either the ball 28 or the conical locking element 29 can be employed in the same unit.

The locking elements 28, 29 are supported against a beveled outer surface of the actuation cone 18 and are pressed by this surface through openings 27 into locking recesses 30 or 31 provided in the interchanging plate 4 and have surfaces which conform to the engaging surfaces of the locking elements 28, 29. Thereby, the locking elements 28, 29 provide for a form-locking and force-locking fastening of the receiving body 5 with the interchanging plate 4.

The mounting or receiving body 5 of the embodiments of FIGS. 1A, 1B has a further connection opening 32 for connection with a pressure-medium conduit (not shown), for example, a pressure-air conduit. The connection opening 32 is in communication through a passage 33 formed in the mounting body 5 with a cylindrical chamber 34 so that, upon loading of the device with the pressure medium, the piston 20 is pressed in the direction of arrow Y, and thereby the locking elements 28 or 29 are pushed to the locking position, provided with the supporting action of the compression spring 17. If energy or power supply fails the interchanging plate 4 with gripper 1 does not fall off because the locking elements 28 or 29, supported by the compression spring 17, provide for a reliable coupling.

Upon loading of a cylindrical chamber 35, positioned opposite to the cylindrical chamber 34, through a passage 36, a piston 20 can move in the direction of arrow X and the interchanging plate 4 and gripper 1 will be uncoupled from the receiving body 5.

In FIG. 2, a centering or aligning conical member 37 is axially displaceable against the restoring force of a spring 38 positioned in the receiving or mounting body 5, with the spring 38 being supported against a threaded plug or stopper 39. While an axial alignment of the interchanging plate 4 with the mounting body 5 through the centering cone 26 is carried out, a radial centering is also possible by the centering conical member 37.

As shown in FIG. 2, a coupling 40 is provided for an electrical plug 41. Thereby it can be controlled whether or not the gripping fingers 2 are engaged with a workpiece to be treated.

As shown in FIG. 3, a proximity switch 42 is positioned in a recess provided in a mounting body 5a engageable, by a centering cone 26 thereof, with an interchanging plate 4a. A recess 44 serves for receiving a bolt (not shown) for connecting the mounting body 5a to an arm of a robot or manipulating device.

Figure 4:
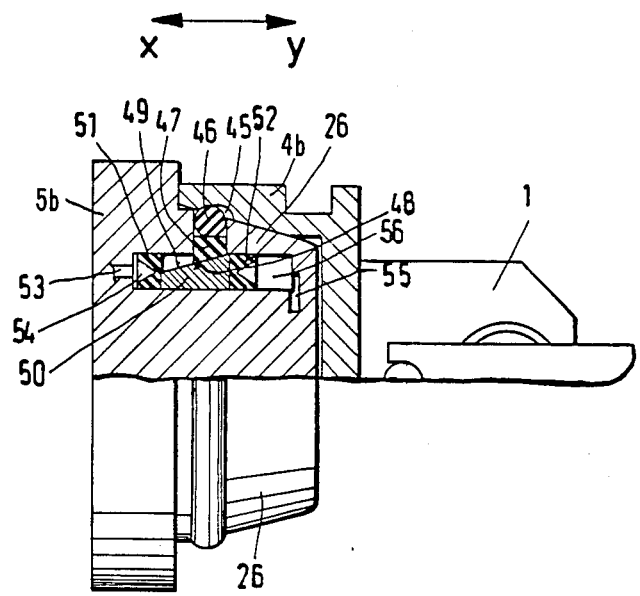
FIG. 4 is a partial cross-sectional view of yet a further embodiment of the present invention.

In the embodiment of FIG. 4, the mounting body 5b is engaged with centering cone 26 in a recess provided in an interchanging plate 4b and matching the shape of the centering cone 26. Thereby, the mounting plate 5b and interchanging plate 4b are axially aligned with respect to each other. The interchanging plate 4b has an annular groove 45, in which an elastic ring 46 is positioned which is supported against a further elastic ring 47 or against individual segments of such ring. Rings 46 and 47 are formed of synthetic rubber plastics. The ring 47 or its segments can be also made of metallic material and have a conical sloped surface 48 which abuts in a form-locking manner against a conical, similarly sloped surface 49 of the annular piston 50. Sealing elements 51 and 52 are inserted at both sides of the annular piston 50. A passage 53 for supplying pressure medium into a cylindrical chamber 54 and a passage 55 for supplying pressure medium into a cylindrical chamber 56 are formed in the mounting body 5. The cylindrical chambers 54 and 56 are alternatingly loaded with the pressure of pressure medium, for example, air, so that the annular piston 50 is displaced either in the direction of the arrow X or in the direction of arrow Y, which results in a respective radial displacement of the ring-shaped element 47 so that ring 46 is either pressed into the annular groove 45 or leaves the latter. Thereby the interchanging plate 4 can be respectively, coupled or uncoupled from the mounting or receiving body 5.

Figure 5:
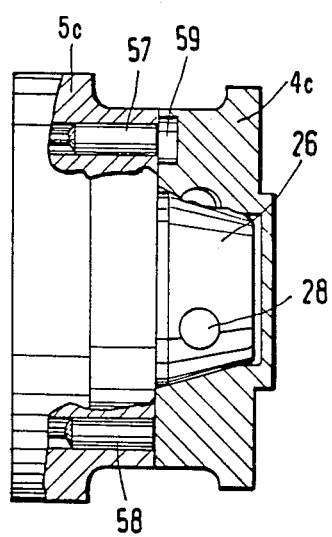
FIG. 5 is a partial cross-sectional view of a still further embodiment of the present invention.

As shown in FIG. 5, two proximity switches 57, 58 may be provided. It is also possible to provide, for example, three proximity switches distributed in the circumferential direction in the mounting body 5c. For example, six codes, which would correspond to the central functions, can be obtained by three proximity switches. A recess 59 is formed in an interchanging plate 4c at the end face thereof abutting against the mounting body 5. At this side, the proximity switch 57 has no contacts. Thereby it can be detected whether the "right" interchanging plate is selected and/or whether this plate is in the "right" position. The proximity switch 58 has "contacts".

In FIGS. 6-8, an interchanging plate 4d is detachably insertable in a magazine plate 60 by grooves 61, 62 for storing purposes. The interchanging plate 4d together with the gripper 1 can be automatically moved from the magazine plate 60. A proximity switch 63 positioned on the plate 60 enables a detection as to whether or not the interchanging plate 4d is inserted into the gripper magazine plate 60 and/or whether the position of plate 4d is correct.

It will be understood that each of the elements described above, or two or more together, may also find a useful application in other types of devices for the automatic exchange and fastening grippers to robots or manipulation apparatus differing from the types described above.

While the invention has been illustrated and described as embodied in a device for the automatic exchange and coupling grippers to robots or manipulation devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for an automatic interchange and coupling of grippers on robots, the device comprising a mounting body connectable to a robot; a gripper-holding interchanging plate removably-connectable to said mounting plate; coupling means for coupling said interchanging plate to said mounting body and including a cylindrical piston movable in said mounting body in an axial direction of said mounting body, an actuation cone integrally formed on one end of said cylindrical piston, adjustable locking means cooperating with said actuation cone for aligning and locking said interchanging plate with said mounting body, spring means accommodated in said cylindrical piston for exerting a pressure on said cylindrical piston so as to constantly retain the actuation cone in a locking position, and wherein said piston is loadable with a pressure of a pressurized medium at opposite axial sides thereof and its movement path along the axis of the mounting body is displaceable by said pressure.

2. The deivce as defined in claim 1, wherein said piston has a piston rod, said piston rod being formed in one-piece with said actuation cone.

3. The device as defined in claim 2, wherein said interchanging plate is formed with recesses, said locking elements, upon the movement of said piston, being radially outwardly pressed by said cone into said recesses to thereby couple said interchanging plate to said mounting body.

4. The device as defined in claim 3, wherein said locking elements are balls.

5. The device as defined in claim 3, wherein said locking elements are coupling pins.

6. The device as defined in claim 5, wherein said pins are at least partially conical.

7. The device as defined in claim 1, wherein said piston and said actuation cone are axially symmetrically formed.

8. The device as defined in claim 2, wherein said cylindrical piston and piston rod and said actuation cone are a one-piece hollow member which has one open side, said spring means being a compression spring which extends in said hollow member and is supported at one end thereof against said mounting body and at another end thereof against a closed side of said hollow member which forms said actuation cone.

9. The device as defined in claim 8, wherein said mounting body includes an axially spring-biased centering cone engageable in a centering recess provided in said interchanging plate.

10. The device as defined in claim 9, wherein said mounting body is formed in one-piece with another centering cone and said interchanging plate is formed with a recess conforming to said another centering cone and engaging the latter in assembly.

11. The device as defined in claim 1, wherein said locking elements are conical elements which align said interchanging plate with said mounting body.

12. The device as defined in claim 1, wherein said locking elements are balls which align said interchanging plate with said mounting body.

13. A device as defined in claim 3, further including a plurality of proximity switch means for informing a user of whether the interchanging plate is coupled to the mounting body, and whether the interchanging plate is coupled to the mounting body in a correct position.

14. The device as defined in claim 13, further including an electric plug mounted to said mounting body and at least one coupling element connectable to said plug for the transmitting of electrical signals.

15. The device as defined in claim 2, wherein said cylindrical piston is ring-shaped.

16. The device as defined in claim 3, wherein said locking elements are ring-shaped elastic elements.

17. The device as defined in claim 3, wherein said interchanging plate is provided with opposing side grooves for supporting in a predetermined position of a magazine plate.

18. The device as defined in claim 17, wherein said magazine plate is provided with at least one proximity switch for detecting a position of said interchanging plate.

19. The device as defined in claim 1, further including a self-sealing elastic sleeve mounted in a region between said mounting body and said interchanging plate for passing the pressurized medium therethrough.

* * * * *